United States Patent
Aherns et al.

(10) Patent No.: US 11,987,515 B2
(45) Date of Patent: May 21, 2024

(54) APPARATUS AND METHOD FOR ENGAGING A MOVING GLASS RIBBON

(71) Applicant: Corning Incorporated, Corning, NY (US)

(72) Inventors: Jeffrey Howard Aherns, Pine City, NY (US); Nanhu Chen, Horseheads, NY (US); Rui Zhang, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 780 days.

(21) Appl. No.: 17/046,946

(22) PCT Filed: Apr. 10, 2019

(86) PCT No.: PCT/US2019/026739
§ 371 (c)(1),
(2) Date: Oct. 12, 2020

(87) PCT Pub. No.: WO2019/199933
PCT Pub. Date: Oct. 17, 2019

(65) Prior Publication Data
US 2021/0114914 A1    Apr. 22, 2021

Related U.S. Application Data

(60) Provisional application No. 62/656,624, filed on Apr. 12, 2018.

(51) Int. Cl.
*B25J 9/16* (2006.01)
*C03B 17/06* (2006.01)
(Continued)

(52) U.S. Cl.
CPC ........ *C03B 17/064* (2013.01); *C03B 33/0215* (2013.01); *B25J 9/16* (2013.01);
(Continued)

(58) Field of Classification Search
CPC .............................. C03B 35/14; C03B 17/06
See application file for complete search history.

(56) References Cited

U.S. PATENT DOCUMENTS

| | | | | |
|---|---|---|---|---|
| 4,505,049 A | * | 3/1985 | Kuno | B25J 13/088 |
| | | | | 33/655 |
| 4,679,331 A | * | 7/1987 | Koontz | G01B 7/004 |
| | | | | 33/503 |

(Continued)

FOREIGN PATENT DOCUMENTS

| | | | | |
|---|---|---|---|---|
| CN | 108698916 | * | 12/2015 | ............. B32B 17/06 |
| EP | 2360125 A1 | | 8/2011 | |

(Continued)

OTHER PUBLICATIONS

International Search Report and Written Opinion of the International Searching Authority; PCT/US2019/026739; dated Jul. 29, 2019; 11 pages; Korean Intellectual Property Office.

(Continued)

*Primary Examiner* — Jodi C Franklin
(74) *Attorney, Agent, or Firm* — Matthew J. Mason

(57) ABSTRACT

A method for forming a glass sheet includes forming a glass ribbon. A robot arm is operated to move an end effector through a preprogrammed cycle. The cycle includes engaging a segment of the glass ribbon with the end effector, separating the engaged segment from the glass ribbon to generate a glass sheet, and moving the glass sheet away from the glass ribbon. The preprogrammed cycle designates predetermined positions of the end effector at predetermined points in time. While the robot arm is operating through the preprogrammed cycle, a parameter indicative of a force being exerted on the glass ribbon by the end effector is sensed. A position of the end effector is altered to differ from the predetermined position at the corresponding point in (Continued)

time when the sensed parameter deviates from a target value. An excessive force applied to the glass ribbon can be reduced in real-time.

19 Claims, 16 Drawing Sheets

(51) Int. Cl.
  *C03B 33/02*  (2006.01)
  *C03B 33/033*  (2006.01)
  *C03B 33/023*  (2006.01)
(52) U.S. Cl.
  CPC ........ *C03B 17/068* (2013.01); *C03B 33/0235* (2013.01); *C03B 33/033* (2013.01)

(56) References Cited

U.S. PATENT DOCUMENTS

| | | | |
|---|---|---|---|
| 4,715,772 A * | 12/1987 | Kanayama | B23P 19/006 414/730 |
| 5,178,506 A * | 1/1993 | Meschi | B65G 1/0407 414/268 |
| 5,632,595 A * | 5/1997 | Mori | B65G 49/069 414/797 |
| 6,616,025 B1 | 9/2003 | Andrewlavage | |
| 7,260,959 B2 | 8/2007 | Chang et al. | |
| 7,430,880 B2 | 10/2008 | Butts et al. | |
| 8,047,085 B2 | 11/2011 | Cady et al. | |
| 8,396,594 B2 * | 3/2013 | Okazaki | G05B 19/423 700/254 |
| 8,413,468 B2 | 4/2013 | Pigorini | |
| 8,887,530 B2 | 11/2014 | Markham et al. | |
| 9,090,412 B2 | 7/2015 | Hagan et al. | |
| 9,463,993 B2 * | 10/2016 | Brown | C03B 35/005 |
| 9,758,418 B1 * | 9/2017 | El-Kahlout | C03B 17/064 |
| 11,806,873 B2 * | 11/2023 | Nagata | B25J 9/1633 |
| 2004/0187523 A1 | 9/2004 | Cox | |
| 2004/0240972 A1 * | 12/2004 | Mori | B65G 49/068 414/222.01 |
| 2005/0268655 A1 | 12/2005 | Butts et al. | |
| 2006/0042315 A1 | 3/2006 | Chang et al. | |
| 2007/0095108 A1 | 5/2007 | Kirby et al. | |
| 2009/0092472 A1 * | 4/2009 | Luo | C03B 33/0215 414/217 |
| 2010/0319193 A1 | 12/2010 | Ushio et al. | |
| 2011/0226018 A1 * | 9/2011 | Pigorini | C03B 9/40 212/223 |
| 2012/0065902 A1 * | 3/2012 | Nakajima | B25J 13/085 702/56 |
| 2012/0103018 A1 | 5/2012 | Lu et al. | |
| 2012/0304695 A1 * | 12/2012 | Lakota | C03B 17/064 65/97 |
| 2013/0047674 A1 * | 2/2013 | Markham | C03B 33/0215 65/324 |
| 2013/0067956 A1 | 3/2013 | Hagan et al. | |
| 2013/0133367 A1 * | 5/2013 | Abramov | C03B 21/00 65/53 |
| 2014/0107843 A1 * | 4/2014 | Okazaki | G05B 19/423 700/260 |
| 2014/0298863 A1 | 10/2014 | Markham et al. | |
| 2015/0152344 A1 * | 6/2015 | Gueh | C10J 3/86 422/198 |
| 2015/0251320 A1 | 9/2015 | Ueno et al. | |
| 2015/0273692 A1 * | 10/2015 | Ogawara | B25J 19/021 901/9 |
| 2016/0102008 A1 * | 4/2016 | Abramov | C03B 17/064 65/97 |
| 2016/0259236 A1 | 9/2016 | Warren-Hill | |
| 2016/0311111 A1 * | 10/2016 | Ogawara | B25J 13/085 |
| 2016/0346928 A1 * | 12/2016 | Zhang | B25J 9/1679 |
| 2018/0126547 A1 * | 5/2018 | Corkum | B25J 9/1664 |
| 2018/0297198 A1 * | 10/2018 | Dan | B25J 9/1697 |
| 2019/0135674 A1 * | 5/2019 | El-Kahlout | C03B 17/067 |
| 2019/0168385 A1 * | 6/2019 | Du | B25J 9/1638 |
| 2020/0206924 A1 * | 7/2020 | Pivac | B25J 9/1674 |
| 2020/0325061 A1 * | 10/2020 | Kimmel | C03B 33/033 |
| 2021/0024412 A1 * | 1/2021 | Liu | B08B 11/04 |
| 2021/0260757 A1 * | 8/2021 | Nielsen | B25J 9/1633 |
| 2024/0010541 A1 * | 1/2024 | Bressler | C03B 13/10 |

FOREIGN PATENT DOCUMENTS

| | | | |
|---|---|---|---|
| JP | 2001-062763 A | 3/2001 | |
| JP | 2008-511522 A | 4/2008 | |
| JP | 2009-028853 A | 2/2009 | |
| JP | 2013-043828 A | 3/2013 | |
| JP | 2015-199184 A | 11/2015 | |
| WO | 2014/209833 A1 | 12/2014 | |
| WO | WO-2015026777 A1 * | 2/2015 | ........... C03B 17/064 |
| WO | WO-2017195413 A1 * | 11/2017 | ............. C03B 17/06 |

OTHER PUBLICATIONS

Pettersson et al., "A hygienically designed force gripper for flexible handling of variable and easily damaged natural food products", Innovative Food Science & Emerging Technologies, vol. 12, Issue 3, 2011, pp. 344-351.

Stepien et al., "Control of tool/workpiece contact force with application to robotic deburring", IEEE Journal on Robotics and Automation, vol. 3, No. 1, Feb. 1987, pp. 7-18.

Chinese Patent Application No. 201980031368.5, Office Action, dated May 5, 2022, 18 pages (9 pages of English Translation and 9 pages of Original Document), Chinese Patent Office.

Taiwanese Patent Application No. 108112600, Office Action dated Nov. 1, 2022, 3 pages (English Translation Only); Taiwanese Patent Office.

Japanese Patent Application No. 2020-555503, Office Action, dated Jan. 4, 2023, 12 pages (6 pages of English Translation and 6 pages of Original Copy); Japanese Patent Office.

* cited by examiner

APPARATUS AND METHOD FOR ENGAGING A MOVING GLASS RIBBON

CROSS-REFERENCE TO RELATED APPLICATIONS

This application is a National Stage application under 35 U.S.C. § 371 of International Application No. PCT/US2019/026739, filed on Apr. 10, 2019, which claims the benefit of priority to U.S. Provisional Application No. 62/656,624 filed on Apr. 12, 2018, the contents of which are incorporated herein by reference in their entireties.

BACKGROUND

Field

The present disclosure generally relates to apparatuses and methods for interfacing with a moving glass ribbon. More particularly, it relates to apparatuses and methods for engaging a glass ribbon in a glass making processes, for example in connection with separating a sheet of glass from a moving ribbon of glass.

Technical Background

Downdraw processes like the fusion-draw process produce a continuous ribbon of glass (or "glass ribbon") that transitions from a viscous glass-forming material to an elastic solid as the glass descends from a forming body. As the length of the glass ribbon grows, a point is reached where a cutting apparatus cuts (separates) a glass sheet from the glass ribbon. Traditionally, the separation of individual glass sheets has been performed by forming a score line in the glass ribbon. A traveling anvil machine (TAM) is oftentimes used to form the score line. An engagement device (e.g., one or more vacuum or suction cups) is attached or engaged to the glass ribbon below the score line, and that portion of the glass ribbon below the score line is caused to rotate (e.g., on the order of 15 degrees or less) to cause the glass ribbon to break at the score line and thus form the desired glass sheet. The engagement device is typically carried by a robot (i.e., the engagement device is an end effector of the robot) programmed or operated to repeatedly bring the engagement device into contact with the glass ribbon, effect a bending motion into the glass ribbon, and carry the separated glass sheet to another location in the glass manufacturing facility. A robot, as used herein, refers generally to a machine (e.g., electrical, hydraulic, pneumatic or a combination thereof) that performs predetermined tasks automatically, usually under the control of a computer. Robots often include articulated arms or appendages with specialized ends to facilitate the intended function.

Any time there is contact with the moving glass ribbon, the potential for damaging the glass ribbon or glass sheet is present. For example, motion induced into the glass ribbon by the robot can propagate upward into the viscous region of the glass ribbon, possibly resulting in stresses that may become frozen into the solidifying glass ribbon. Further, excessive forces or torques imparted onto the glass ribbon as part of the separation process may generate a significant number of glass particles that in turn may lead to adhered glass defect concerns. The preprogrammed robot operational cycle implemented by the robot to bring the end effector into engagement with the glass ribbon, separate the glass sheet, and move the glass sheet away from the glass ribbon is typically based upon an expected location of the glass ribbon, an expected glass ribbon flow rate, and in some instances, attempted tracking of the glass ribbon travel rate. Previously, controlling robot operations and movement on these bases was considered highly viable. However, in response to market demands for thinner and thinner glass sheets, and glass manufacturers' desire to utilize elevated glass ribbon flow rates, conventional robot operational control may give rise to deleterious glass ribbon-robot interfaces due, for example, to the inherent variabilities in the environment of the glass ribbon-robot interface such as air dynamics, glass ribbon motions, glass ribbon cross-the-draw thickness, geometry, etc.

Accordingly, alternative apparatuses and methods for engaging a glass ribbon with a robot end effector in a glass making processes, for example in connection with separating a glass sheet from a moving glass ribbon in a glass manufacturing process, are disclosed herein.

SUMMARY

Some embodiments of the present disclosure relate to a method for forming a glass sheet. The method include flowing molten glass from a forming body in a downdraw process to form a continuously moving glass ribbon. A robot arm carrying an end effector is operated to move the end effector through a preprogrammed robot operational cycle that initiates at a start time. The robot operational cycle includes engaging a segment of the glass ribbon with the end effector, then separating the engaged segment from a remainder of the glass ribbon to generate a glass sheet, and then moving the glass sheet away from the glass ribbon. In this regard, the preprogrammed robot operation cycle includes or designates predetermined positions of the end effector at predetermined points in time following the start time. While the robot arm is operating through the preprogrammed operational cycle, at least one parameter indicative of at least one force being exerted on the glass ribbon by the end effector is sensed. A position of the end effector is altered so as to differ from the predetermined position at the corresponding point in time when the sensed parameter deviates from a target value. With some methods of the present disclosure, an excessive force applied to the glass ribbon by the robot end effector can be reduced on a real-time or near real-time basis. In some embodiments, the sensor senses one or more of a linear force and a torque being applied onto the glass ribbon by the end effector, and the methods include determining a correction value by which the end effector positon should be changed based upon the sensed force. In some embodiments, the preprogrammed robot operational cycle includes or designates predetermined velocities of the end effector at predetermined points in time, and the methods include altering the velocity of the end effector so as to differ from the predetermined velocity at the corresponding point in time when the sensed parameter deviates from a target value.

Yet other embodiments of the present disclosure relate to a system for producing a glass sheet. The system includes a forming body and a handling apparatus. The forming body is configured to form a glass ribbon from a molten glass. The handling apparatus is provided to interface with the glass ribbon and includes a robot arm, an end effector and a sensor. The end effector is carried by the robot arm and is configured to selectively engage a segment of the glass ribbon. The sensor is carried by the robot arm and is configured to sense at least one parameter indicative of a force exerted on the glass ribbon by the end effector. In some embodiments, the sensor is a multiple-axis force sensor, for example a six-degrees-of-freedom force sensor. In some embodiments, the sensor is positioned between a joint of the robot arm and the end effector. In some embodiments, the handling apparatus further includes a controller programmed to control operations of the robotic arm based upon a preprogrammed robot operational cycle and to adjust a predetermined position or velocity of the end effector as designated by the preprogrammed robot operational cycle in response to the sensed parameter.

Additional features and advantages will be set forth in the detailed description which follows, and in part will be readily apparent to those skilled in the art from that description or recognized by practicing the embodiments described herein, including the detailed description which follows, the claims, as well as the appended drawings.

Both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
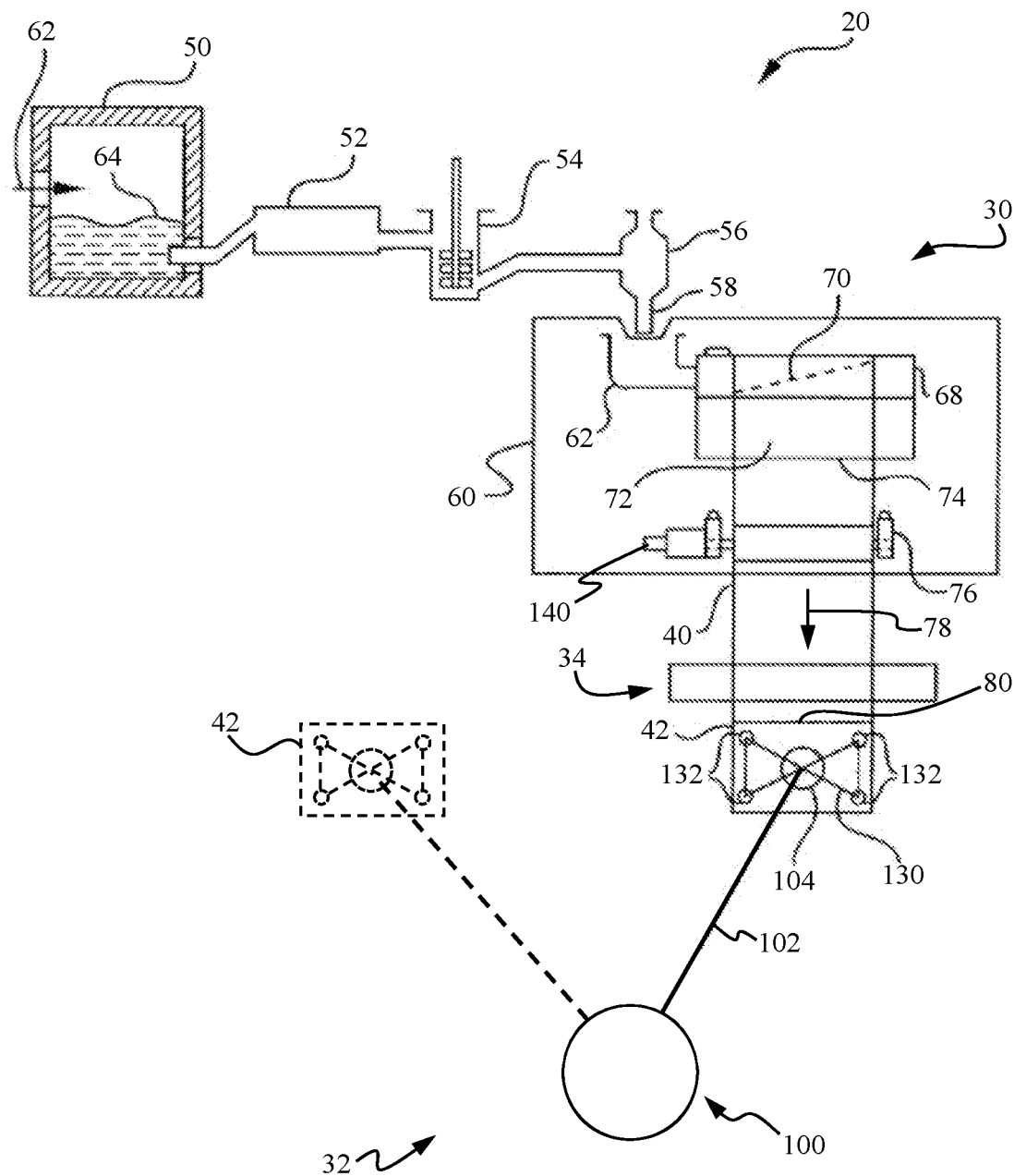
FIG. 1 is a diagrammatic view of an exemplary glass sheet production system using a handling apparatus in accordance with principles of the present disclosure.

Reference will now be made in detail to various embodiments of systems, apparatuses and methods for forming a glass sheet. Whenever possible, the same reference numerals will be used throughout the drawings to refer to the same or like parts.

Some aspects of the present disclosure provide glass ribbon production systems in which a continuously moving glass ribbon is separated into individual glass sheets. Although the systems, apparatuses and methods are described herein as being useful with glass ribbons or glass sheets, the systems, apparatuses and methods of the present disclosure can also be employed with other substrates such as plastic substrates. With this mind, FIG. 1 is an exemplary glass manufacturing system 20 in accordance with principles of the present disclosure and useful in forming a glass sheet. The system 20 includes a glass forming apparatus 30 (referenced generally) and a handling apparatus 32 (referenced generally). In some embodiments, the system 20 can optionally further include a scoring apparatus 34. In general terms, the glass forming apparatus 30 generates a glass ribbon 40, and the handling apparatus 32 is operable to interface with the glass ribbon 40, for example in separating a glass sheet 42 from the glass ribbon 40 (either alone or in combination with operation of the scoring apparatus 34), and to move the separated glass sheet 42 away from the glass ribbon 40.

In some non-limiting embodiments, the glass forming apparatus 30 can be a downdraw glass forming apparatus. Downdraw glass forming processes for manufacturing glass substrates such as the glass ribbon 40 and employing equipment such as the glass forming apparatus 30 are sometimes referred to as fusion processes, overflow processes or overflow downdraw processes. The schematic representations of the glass forming apparatus 30 and the handling apparatus 32 are referred to herein with respect to the descriptions to set forth aspects, embodiments and examples of methods and apparatuses for producing a glass sheet, such as the glass sheet 42 for example.

Included in the glass forming apparatus 30 illustrated in FIG. 1 is a melting furnace 50, a fining vessel 52, a stirring vessel 54, a receiving vessel 56, a downcomer 58, and a fusion draw unit 60. The melting furnace 50 is provided with a batch material that, as denoted by arrow 62, is charged into the furnace 50 and melted in the furnace 50 to produce a glass-forming material (hereinafter molten glass 64). The molten glass 64 is conveyed from the melting furnace 50 to the fining vessel 52. The fining vessel 52 has a high temperature processing area that aids in removing air bubbles from the molten glass 64. The molten glass 64 then flows into the stirring vessel 54 where mixing occurs, for example to better ensure an even consistency. The homogenized molten glass from the stirring vessel 54 then flows to the receiving vessel 56, and is then routed to the fusion draw unit 60 through the downcomer 58 and an inlet 66 where the molten glass 64 is formed into the glass ribbon 40.

The fusion draw unit 60 includes a forming body (e.g., wedge) 68 having an open channel 70 formed on an upper surface of the forming body 62, and a pair of converging forming surfaces 72 (one of which is visible in FIG. 1) that converge at lower apex that comprises a root 74 of the forming body 68. Molten glass supplied to the forming body 68 flows into the open channel 70 and overflows the walls thereof, thereby separating into two individual flows or streams of molten glass that flow over the converging forming surfaces 72. When the separate flows of molten glass reach the root 74, they recombine, or fuse, to form a single ribbon of viscous molten glass (i.e., the glass ribbon 40) that descends from the root 74. The glass ribbon 40 cools as it descends and passes through a glass transition temperature range where the glass ribbon 40 undergoes a transformation from a viscous liquid to an elastic solid. Pulling roll assembly 76 aids in drawing the glass ribbon 40 downward away from the root 74, as indicated by arrow 78. The pulling roll assembly 76 can include one or more pulling rolls that are driven, such as by suitable motors.

To separate a glass sheet (e.g., the glass sheet 42) from the glass ribbon 40, the scoring apparatus 34 can be utilized. The scoring apparatus 34 can be a traveling anvil machine that typically includes an anvil or backing bar and a scoring device. The scoring device can assume various forms appropriate for forming a score line in the glass ribbon 40, such as a wheel cutter, a laser, etc. Regardless, the scoring apparatus 34 operates to cut a score line 80 in the glass ribbon 40, demarcating a glass sheet from a remainder of the glass ribbon 40.

Prior to, during, or following the scoring operation, the handling apparatus 32 engages the portion of the glass ribbon 40 downstream of the score line 80 relative to the direction of travel 78. The handling apparatus 32 is described in greater detail below. In general terms, the handling apparatus 32 includes a robot 100 having a robot arm 102 carrying an end effector 104. The robot 100 operates to bring the end effector 104 into engagement with the glass ribbon 40 and then apply a bending moment to the glass ribbon 40 in a direction perpendicular to a major surface of the glass ribbon 40 following completion of the score line 80. The bending moment induced by the handling apparatus 32 produces a tensile stress across the score line 80 that causes a crack to form at the score line 80. The crack propagates through the thickness of the glass ribbon 40, thereby separating a glass sheet from the glass ribbon 40. The backing bar and any additional nosing bars that may be employed with the scoring apparatus 34 are then disengaged from the glass ribbon 40 and the scoring apparatus 34 is arranged back to a starting position in preparation for another cutting cycle. The end effector 104 remains engaged with the now-completed glass sheet 42, and the robot 100 operates to move the glass sheet 42 away from the glass ribbon 40 for subsequent processing (represented by dashed lines in FIG. 1).

Aspects of the present disclosure are equally applicable to other substrate (e.g., glass ribbon) forming techniques, such as a single sided overflow process or a slot draw process, which basic processes are well known to those skilled in the art.

Figure 2A:
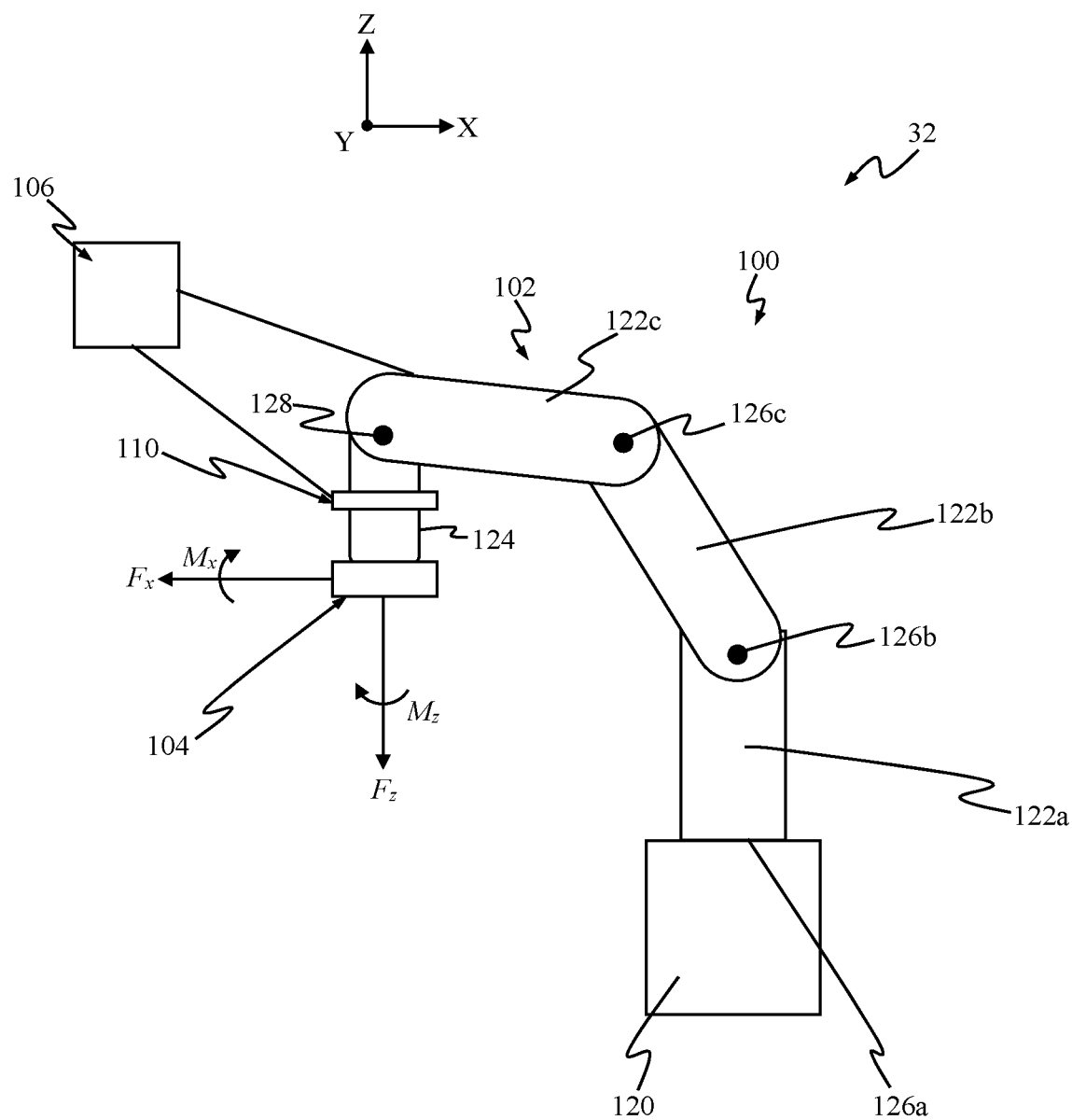
FIG. 2A is a simplified side view of a handling apparatus useful with the glass sheet production system of claim 1, with portions shown in block form.
Figure 2B:
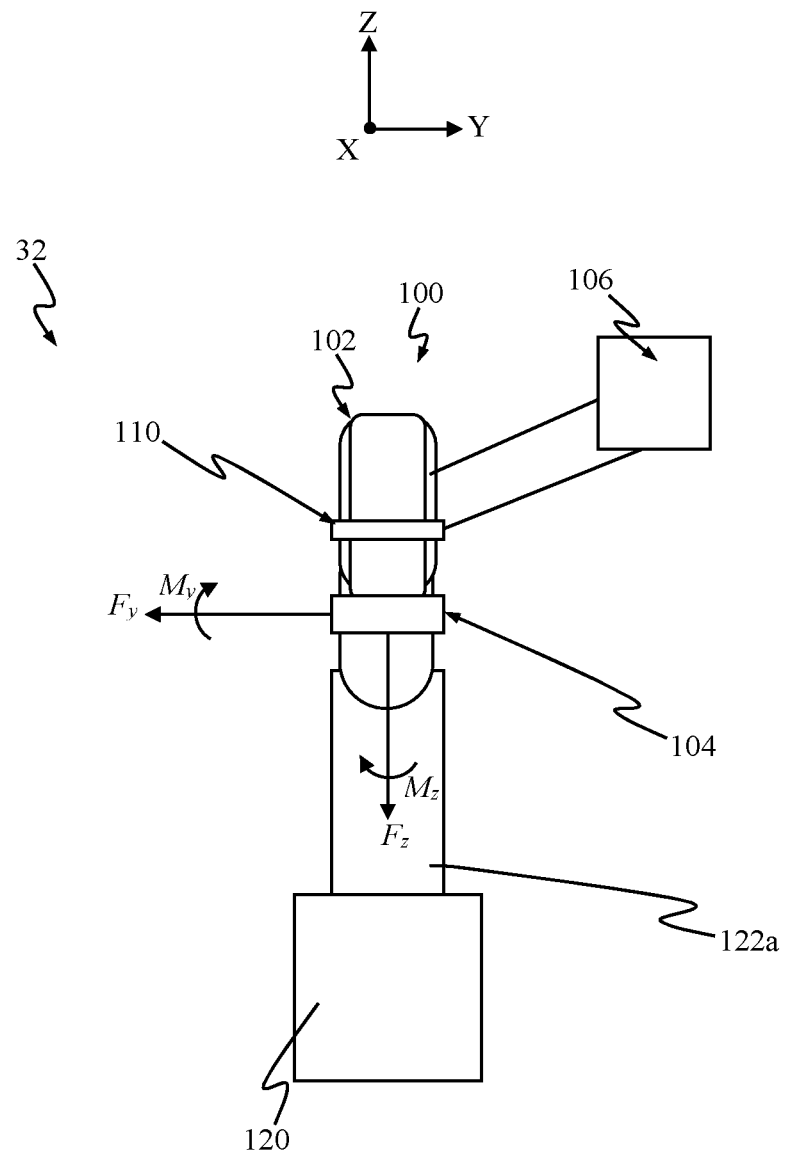
FIG. 2B is a simplified front view of the handling apparatus of FIG. 2A.

Exemplary embodiments include the handling apparatus 32 shown in greater detail in FIGS. 2A and 2B. The handling apparatus 32 includes the robot 100 and at least one sensor 110. The robot 100 can assume various forms known in the art and useful in repeatedly engaging a moving glass ribbon, separating a glass sheet from the glass ribbon, and moving the glass sheet to a location away from the glass ribbon, and generally includes the robot arm 102, the end effector 104, and a control system 106. As described in greater detail below, in some embodiments the sensor 110 is carried by the robot arm 102 and is configured (e.g., sensor construction, mounting location along the robot arm 102, etc.) to sense and/or signal information indicative of one or more forces (e.g., linear force, torque, etc.) being experienced by or at the end effector 104, and thus being exerted on the glass ribbon 40 (FIG. 1) by the end effector 104 (as driven by the robot arm 102) when the end effector 104 is interfacing with the glass ribbon 40. The control system 106 can adjust operation of the robot arm 102 based upon the sensed, force-related information.

The robot arm 102 is generally configured to move the end effector 104 to specific positions in space (along the axes X, Y, Z), as well as to rotate the end effector 104 (e.g., about one or more or all of the axes X, Y, Z). A construction of the robot arm 102 can be selected to accommodate a desired reach distance and motion ranges for a particular glass manufacturing installation, as well to handle expected loads. In some embodiments, the robot arm 102 includes a base or column 120, two or more arm segments or links (e.g., trailing, intermediate and leading arm segments 122a, 122b, 122c), and a wrist segment 124. The trialing arm segment 122a is connected to and extends from the base 120. A pivotable or rotatable connection can be established between the trailing arm segment 122a and the base 120, for example at a joint 126a. The intermediate arm segment 122b is connected to and extends from the trailing arm segment 122a at a joint 126b (referenced generally) that can provide for pivoting and/or rotational movement of the intermediate arm segment 122b relative to the trailing arm segment 122a. Similarly, the leading arm segment 122c is connected to and extends from the intermediate arm segment 122b at a joint 126c (referenced generally) that can provide for pivoting and/or rotational movement of the leading arm segment 122c relative to the intermediate arm segment 122b. The robot arm 102 can include one or more drive assemblies (e.g., powered motor driving a mechanical gear reducer or other linkage, pneumatic system, hydraulic system, etc.) that dictate and control motions at one or more of the joints 126a, 126b, 126c. In other embodiments, the robot arm 102 can include more or less than three of the arm segments 122a, 122b, 122c.

The wrist segment 124 is connected to and extends from the leading arm segment 122c at a joint 128 that can provide for pivoting and/or rotational movement of the wrist segment 124 relative to the leading arm segment 122c. An appropriate drive system (not shown) can dictate and control motions at the joint 128. The wrist segment 124 is configured to carry and maintain the end effector 104, and in some embodiments incorporates a driven rotational joint that can effect spatial rotation of the end effector 104, for example about one or more of the axes X, Y, Z.

It will be understood that the robot arm 102 as shown and described is but one non-limiting example of a robot arm useful in the manufacture of a glass sheet from a moving glass ribbon. Other configurations are equally acceptable. In some embodiments, robot arms of the present disclosure are available, for example, from FANUC America Corp. of Rochester Hills, MI under the trade designation LR Mate™.

The end effector 104 can assume various forms apparent to one of ordinary skill appropriate for interfacing with a glass ribbon and/or glass sheet. In some embodiments for example, and as generally shown in FIG. 1, the end effector 104 can include a frame 130 maintaining one or more soft vacuum suction cups 132. Vacuum lines (not shown) are connected to the suction cups 132 and extend to a vacuum source (not shown) for generating a negative pressure or vacuum at the suction cups 132. Other end effector formats configured to interface with a glass ribbon are also acceptable.

Returning to FIG. 2, the control system 106 includes one or more computer or computer-like device (e.g., a programmable logic controller) that is or are electronically connected (wired or wireless) to the robot arm 102, the sensor 110, and optionally the end effector 104 (or other components relating to operation of the end effector 104). In general terms, the control system 106 dictates operation and movements of the robot arm 102 (e.g., controls operation of the drive assembly associated with each of the joints 126a, 126b, 126c, 128), and thus a position and movement of the end effector 104 in space. The control system 106 may also dictate operation of the end effector 104 in some embodiments (e.g., the supply of vacuum pressure). The control system 106 can be programmed or can operate on programming (e.g., software, hardware, etc.) that prescribe predetermined positions and movements of the end effector 104 as part of a glass ribbon interface operational cycle (e.g., standard, schedule-based algorithms, etc.), as well as adjust or alter the predetermined positions and movements based upon information from the sensor 110 as described in greater detail below.

The sensor 110 can assume various forms, and is generally configured to sense and/or signal information indicative of a force (e.g., linear force, torque, etc.) being experienced at or by the end effector 104 when interfacing with a glass ribbon (e.g., the glass ribbon 40). In some embodiments, the sensor 110 is a multiple axis or multiple degree-of-freedom force sensor, such as a 6-axis force and/or torque sensor (or six-degrees-of-freedom force sensor) that can sense forces in six directions. Some possible forces that can be sensed are identified in FIGS. 2A and 2B as a force in a direction of the X axis $F_x$, a force in a direction of the Y axis $F_y$, a force in a direction of the Z axis $F_z$, a torque (or moment of force) about the X axis $M_x$, a torque (or moment of force) about the Y axis $M_y$, and a torque (or moment of force) about the Z axis $M_z$. In some embodiments, the sensing components of the sensor 110 can be or include a compact and rugged monolithic transducer that can sense forces in the six directions. The sensor 110 can further include appropriate programming and/or circuitry adapted to generate and transmit electrical signals conveying sensed information, for example directly or indirectly to the control system 106. In some embodiments, the sensor 110 has a sampling rate of at least 50 hertz (Hz), optionally a sampling rate of at least 100 Hz. Some non-limiting examples of six-degrees-of-freedom force sensors useful with the present disclosure include sensors available from FANUC America Corp., under the trade designations FS-10iA™, FS-30™, and FS-60™; force/torque sensors available from ATI Industrial Automation, Inc., for example under the trade designation Omega160™; etc. In other embodiments, the sensor 110 can be configured to sense forces in more or less than six directions.

The sensor 110 is carried by (e.g., mounted to the robot arm 102, mounted to the end effector 104) such that information generated by the sensor 110 is indicative of or implicates force(s) at the end effector 104 for reasons made clear below. For example, and as shown in FIGS. 2A and 2B, in some embodiments the sensor 110 is mounted along the wrist segment 124, and is thus between the last joint of the robot arm 102 (i.e., the joint 128 of the wrist segment 124 and the leading arm segment 122c) and the end effector 104. Alternatively, the sensor 110 can be mounted at other locations along the robot arm 102, to or at the end effector 104, etc. In some embodiments, the robot arm 102 is an existing robot pre-installed at a glass manufacturing facility, and the sensor 110 is retrofitted/mounted to the existing robot arm 102. In other embodiments, the handling apparatus 32, including the sensor 110 carried by to the robot arm 102, is constructed prior to installation at the glass manufacturing facility.

Returning to FIG. 1, the handling apparatus 32 can optionally include one or more secondary sensors 140 (in addition to the sensor 110 (FIG. 2A)) that generate information indicative of a force being exerted on the glass ribbon 40 by the end effector 104. Where provided, information from the secondary sensor 140 can be signaled to the control system 106 (FIG. 2A) for further analyses as described in greater detail below. For example, the secondary sensor 140 can measure or sense torque generated by the motor(s) of the pulling roll assembly 76. By monitoring the pulling roll assembly motor torque before and during the end effector-glass ribbon interface, the tangential force being applied to the glass ribbon 40 by the end effector 104 can be estimated. For example, a current of the pulling roll assembly motor can be measured. Torque can be then be determined from the linear relationship between current and torque for the particular motor. Force on the glass ribbon 40 is then estimated from the determined torque (e.g., force=torque multiplied by the roll radius). Other secondary sensor constructions and locations that generate sensed date implicating forces being applied to the glass ribbon 40 by the end effector 104 are also envisioned. In yet other embodiments, the secondary sensor 140 can be omitted.

Figure 3A:
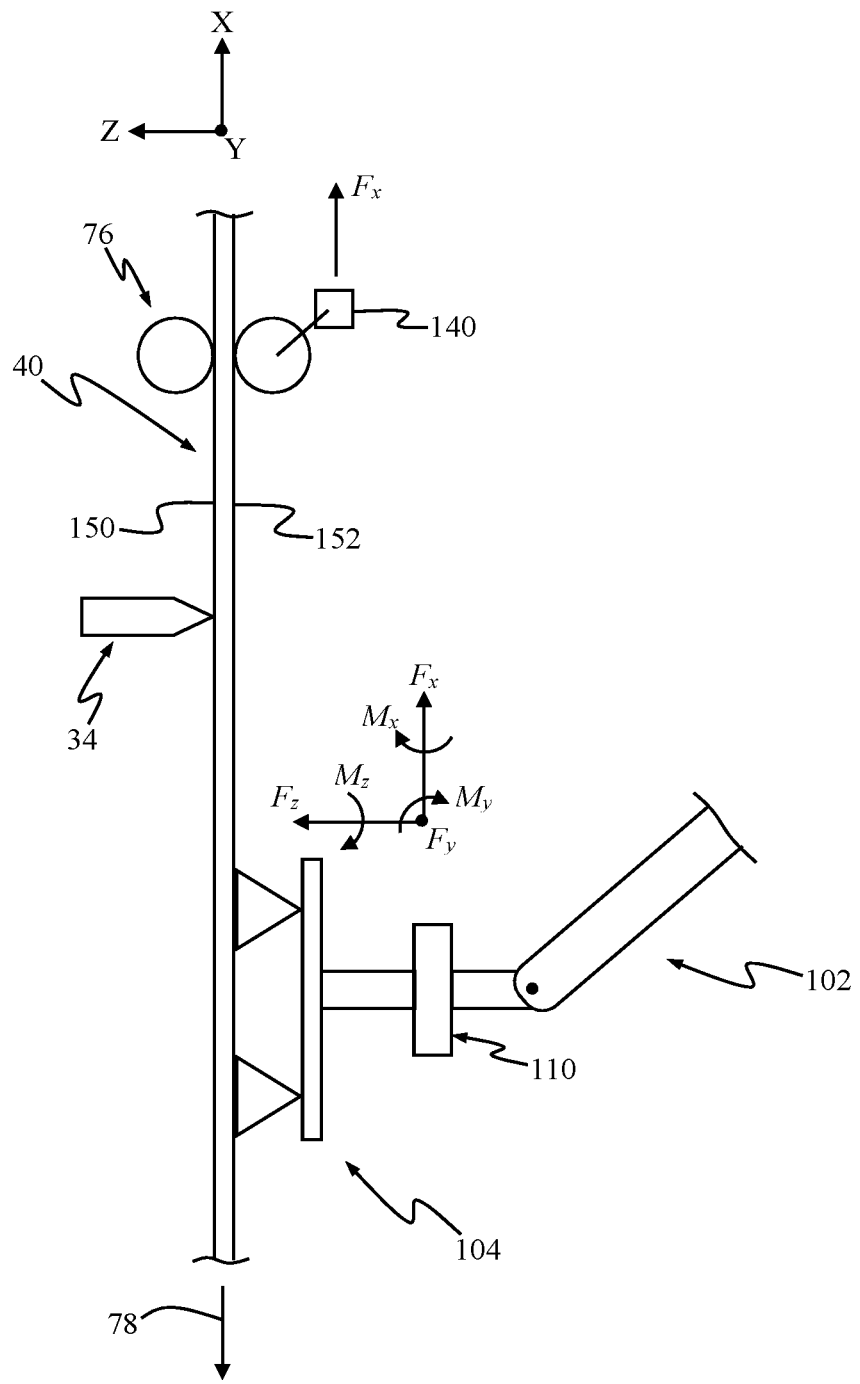
FIG. 3A is a simplified side view of a portion of the glass sheet production system of FIG. 1, including an end effector portion of the handling apparatus interfacing with a glass ribbon.
Figure 3B:
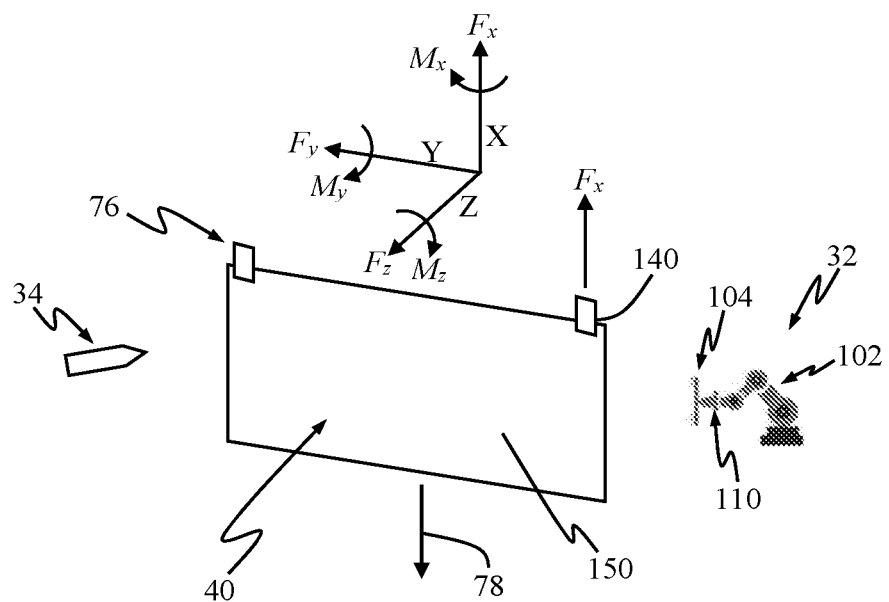
FIG. 3B is a simplified perspective view of portions of the glass sheet production system of FIG. 1 and designating possible forces exerted on a glass ribbon.

With the above constructions, data relating to one or more forces exerted by the end effector 104 onto the glass ribbon 40 as part of an end effector-glass ribbon interface operation are generated by, and can be acted upon, the handling apparatus 32. FIGS. 3A and 3B represent, in simplified form, some of the force information available in some embodiments as the end effector 104 interfaces with the glass ribbon 40. As a point of reference, the glass ribbon 40 is continuously moving in the direction 78, and can be viewed as having or defining opposing, first and second major sides or surfaces 150, 152. The opposing major sides 150, 152 are best seen in FIG. 3A; in the view of FIG. 3B, the second side 152 is primarily hidden. Further, an X, Y, Z Cartesian coordinate system is provided in FIGS. 3A and 3B, and is defined such that the X, Y plane corresponds with the plane of the major surfaces 150, 152. With these conventions in mind, the robot arm 102 is arranged to bring the end effector 104 into contact with the second major side 152 of the glass ribbon 40. Once the end effector 104 is in contact with the glass ribbon, the force-related data sensed by the sensor 110 is indicative of one or more forces being applied to the glass ribbon 40 by the end effector 104 (via operation of the robot arm 102). Where the sensor 110 is, for example, a six-degrees-of-freedom force sensor as described above and the end effector 104 is in contact with the glass ribbon 40, FIGS. 3A and 3B identify that the sensor 110 can sense information indicative of a force on the glass ribbon 40 in a direction of the X axis $F_x$, a force on the glass ribbon 40 in a direction of the Y axis $F_y$, a force on the glass ribbon 40 in a direction of the Z axis $F_z$, a torque (or moment of force) on the glass ribbon 40 about the X axis $M_x$, a torque (or moment of force) on the glass ribbon 40 about the Y axis $M_y$, and a torque (or moment of force) on the glass ribbon 40 about the Z axis $M_z$. Force-related information can be generated for more or less than the six axes in other embodiments.

In some glass ribbon handling operations, other forces may be applied to the glass ribbon 40 simultaneously with the force(s) applied by the end effector 104. For example, operation of the scoring apparatus 34 to form a score line in the first major side 150 may apply one or more forces in one or more directions while the end effector 104 is in contact with the glass ribbon 40. In some embodiments, force(s) applied by the scoring apparatus 34 can be accounted for and/or adjusted in view of the force-related information generated by the sensor 110 as described in greater detail below. In addition, the pulling roll assembly 76 may apply a force or tension onto the glass ribbon 40 while the end effector 104 is in contact with the glass ribbon 40. The secondary sensor 140 can sense information indicative of this applied force. In some embodiments, force(s) applied by the pulling roll assembly 76 can be accounted for and/or adjusted in view of the force-related information generated by the sensor 110 as described in greater detail below.

Figure 4:
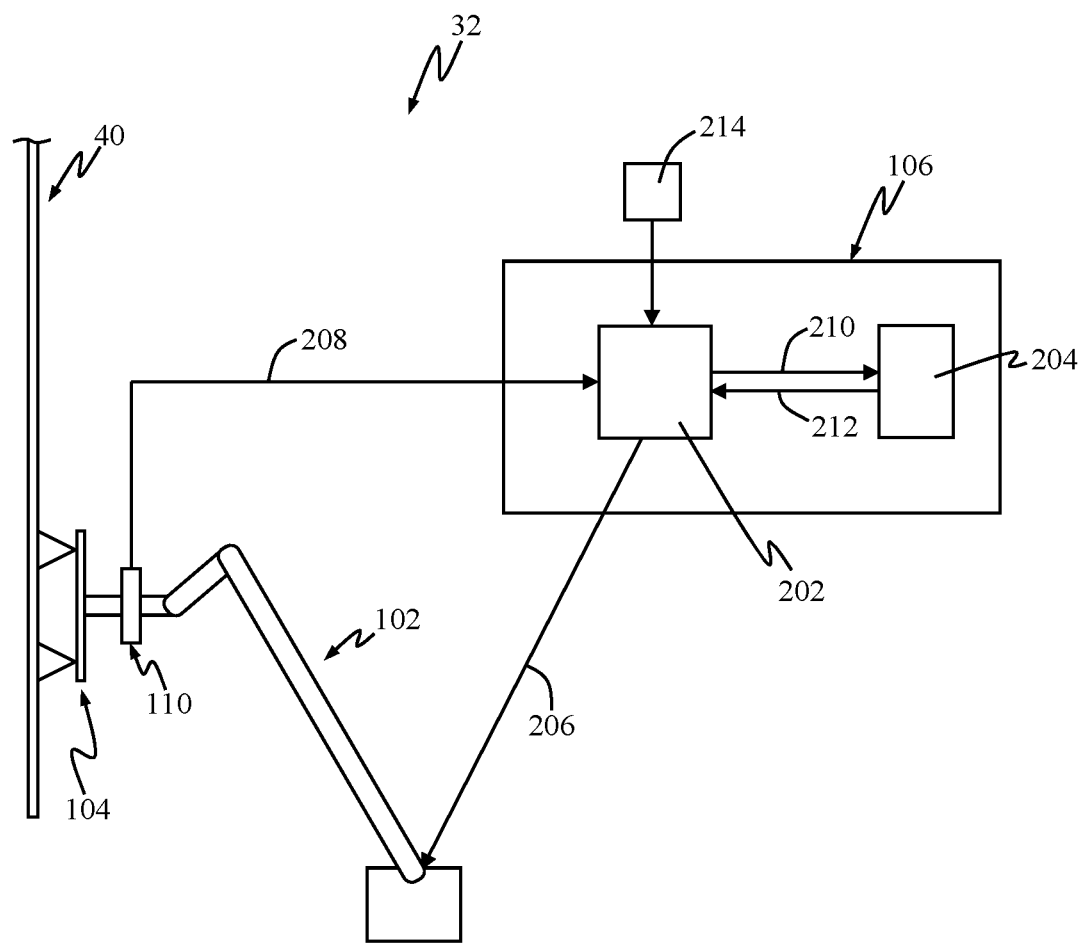
FIG. 4 is a schematic diagram of an exemplary system architecture useful with the handling apparatus of FIG. 1 in operating a robot arm to cause an end effector to interface with a glass ribbon.

The force-related information generated by the sensor 110 during operation of the handling apparatus 32 (e.g., when the end effector 104 is in contact with the glass ribbon 40) can be utilized as part of a real-time or near real-time automated process control in accordance with principles of the present disclosure. FIG. 4 shows an exemplary schematic diagram of a system architecture that may be implemented by the handling apparatus 32 to control operation of the robotic arm 102 during a glass ribbon interface cycle in which the end effector 104 is in contact with the glass ribbon 40. In general terms, the control system 106 can receive signals or data from the sensor 110 (and, where provided, other sensors such as the optional secondary sensor 140 (FIG. 3A), and can transmit control signals to the robot arm 102 to control operations of the robot arm 102.

In some embodiments, the control system 106 can include first and second controllers 202, 204. The first controller 202 can be configured and/or programmed primarily for controlling operations of the robot arm 102, whereas the second controller 204 can be configured and/or programmed primarily to process or analyze force-related feedback information and generate responsive robot arm adjustments. For example, as represented by arrow 206, robot arm motion path instructions or commands generated by and signaled from the first controller 202 directly control motion of the segments of the robot arm 102, or can be delivered to a separate controller at the robot arm 102 that in turn controls movements of the segments of the robot arm 102 in response to the delivered robot arm motion path commands from the first controller 202. Force-related information from the sensor 110 can be signaled to the first controller 202 as represented by arrow 208, and the first controller 202 signals the force-related information to the second controller 204 as represented by arrow 210. Alternatively, the sensor 110 can signal the second controller 204 directly. Regardless, the second controller 204 determines possible adjustments to operation of the robot arm 102 (e.g., a change or adjustment in a position and/or motion of the end effector 104 as otherwise dictated by operation of the robot arm 102) based upon the force-related information (e.g., processing the forced-related information through algorithms, etc.), and signals robot arm adjustment information (or a robot arm position adjustment command) to the first controller 202 as represented by arrow 212. The first controller 202 incorporates the robot arm adjustment information into the robot arm motion path commands generated by the first controller 202 and signaled to the robot arm 102. In some optional embodiments, the first controller 202 can further generate the robot arm motion path commands with additional reference to information inputted by a user (represented in block form at 214).

The first and second controllers 202, 204 can each include a computer or computer-like device (e.g., a programmable logic controller). The first and second controllers 202, 204 can each include various hardware and/or software components, modules, units, etc. The hardware components may include circuits, processors, and memories. The software components may include computer-implemented programs or modules made up of computer executable instructions and/or codes. In some embodiments, each of the first and second controllers 202, 204 includes at least one processor and at least one memory. The processor may be any suitable computer process, such as, for example, a central processing unit, a signal processor, etc. The memory may be any suitable memory configured to store programs, instructions, and/or codes, which may be executed by the corresponding processor, as is known in the art. The first controller 202 can include a communications unit configured to enable the first controller 202 to communicate with various components or devices, such as the robot arm 102, the sensor 110, the second controller 202, etc. The communication unit can be local area data network or a plurality of wired or wireless communication links to various components configured to enable the first controller 202 to receive data or signals (e.g., from the sensor 110, the second controller 204, etc.), and transmit control signals, for example to the robot arm 102 to control operation of the robot arm 102. The second controller 204 can include a similar communications unit.

In some embodiments, the robot arm 102, the end effector 104, and the first controller 202 can be an existing, operational handling apparatus installed at a glass manufacturing facility, and the sensor 110 and the second controller 204 are retro-fitted or installed to the existing handling apparatus. Regardless, by utilizing the second controller 204 to perform force-related analysis and processing, with the second controller 204 then communicating the determined robot arm adjustment information to the first controller 202 for subsequent action, the control system 106 may enable high speed data transmission and processing capability. In other embodiments, the control system 106 can include three or more controllers. In yet other embodiments, the control system 106 can comprise a single controller.

Figure 5:
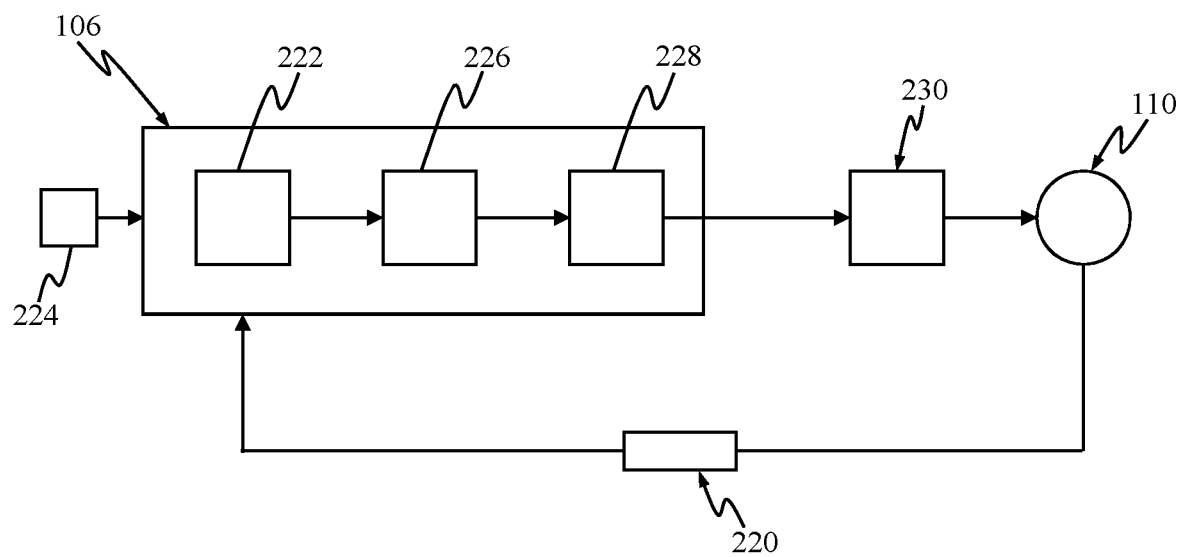
FIG. 5 is a schematic diagram of an exemplary control architecture useful with the handling apparatus of FIG. 1.

FIG. 5 shows an exemplary control diagram or control architecture representing controls that may be implemented by the control system 106 to control a glass ribbon/end effector interface operation in real-time or near real-time. With cross-reference between FIGS. 3A and 5, during operation of the robot arm 102 in which the end effector 104 is brought into contact with the glass ribbon 40, force-related information indicative of a force or forces (e.g., linear force, torque, etc.) being exerted onto the glass ribbon 40 by the end effector 104 are sensed by the sensor 110 and signaled to the control system 106. In some embodiments, signal filtering 220 can be performed. Regardless, the control system 106 can implement a tracking error algorithm 222 to compare the force-related information with a target force. The target force can be pre-determined, can be selected by a user (represented at 224), etc. The tracking error determination can be provided to a force control algorithm 226 implemented by the control system 106. Based upon the tracking error determination, the force control algorithm 226 determines or designates whether an adjustment to a position and/or motion of the end effector 104 is beneficial, and if so, also determines or designates desired robot arm adjustment information or commands. For example, where the force-related information sensed by the sensor 110 indicates that the end effector 104 is applying a linear force onto the glass ribbon 40 in the Z axis direction that deviates from (e.g., exceeds or is below) a designated Z axis target force or maximum linear force (e.g., as determined by the tracking error algorithm 222), the force control algorithm 226 can determine an extent to which the end effector 104 should be adjusted or moved in the Z direction such that the linear force being applied onto the glass ribbon 40 in the Z direction will more closely approximate the designated Z axis target linear force (e.g., approximately 0 force). The robot arm adjustment information (or a robot arm position adjustment command) resulting from the force control algorithm 226 is delivered to a robot position/speed control module 228.

Figure 6A:
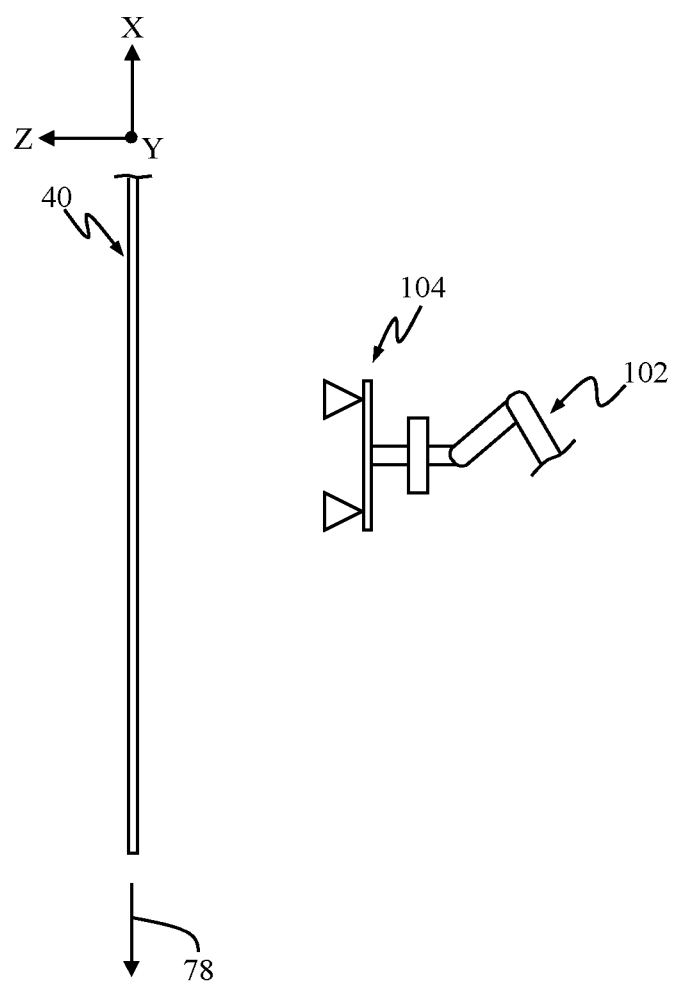
FIGS. 6A-6F illustrate steps of an exemplary robot handling operation.
Figure 6B:
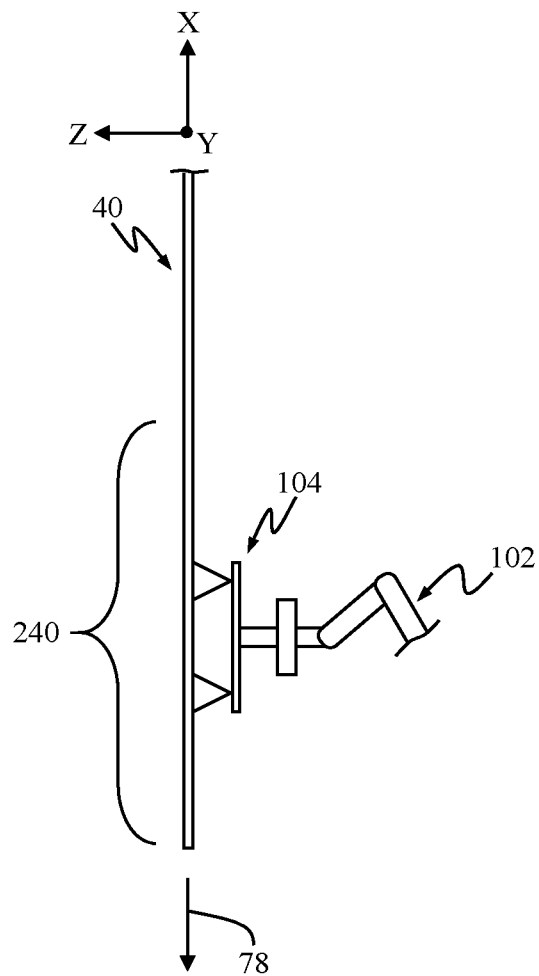
Figure 6C:
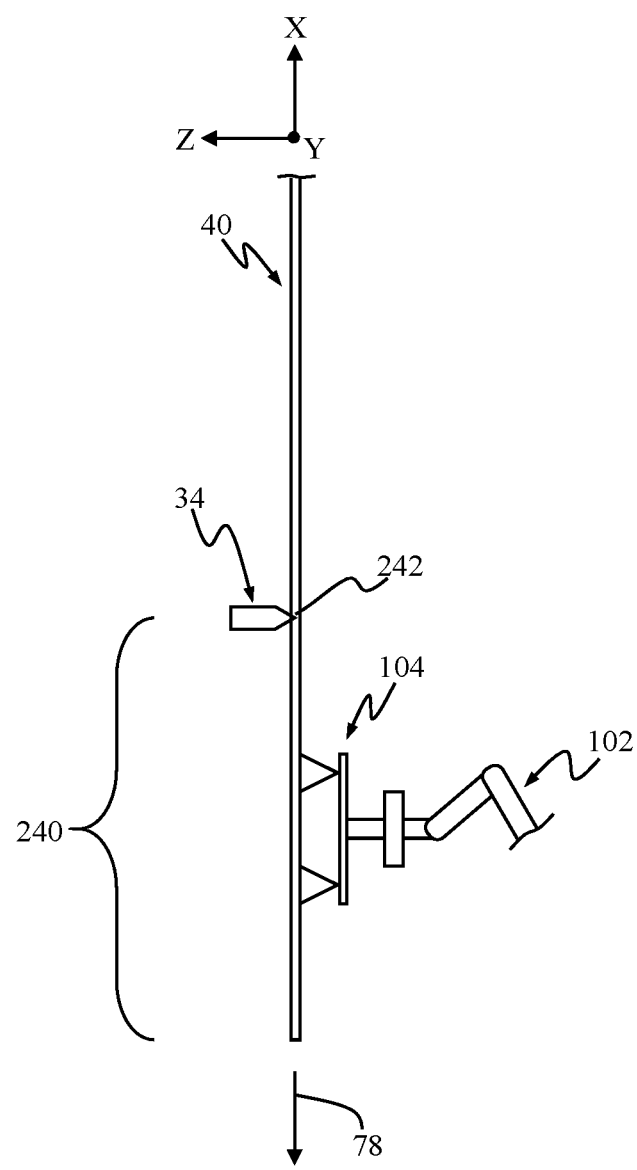
Figure 6D:
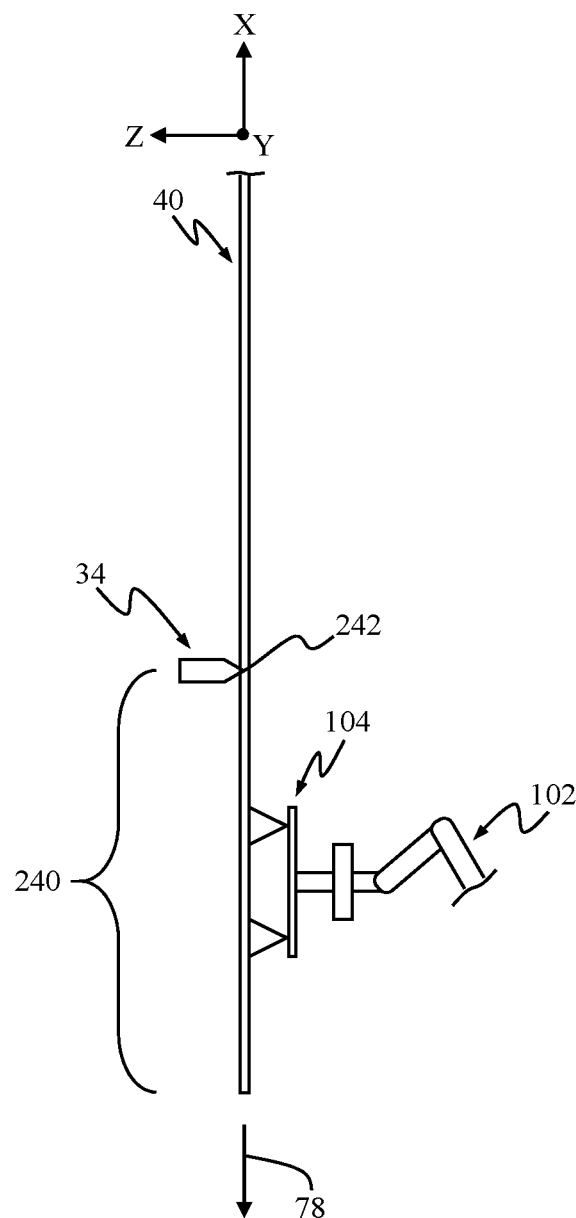
Figure 6E:
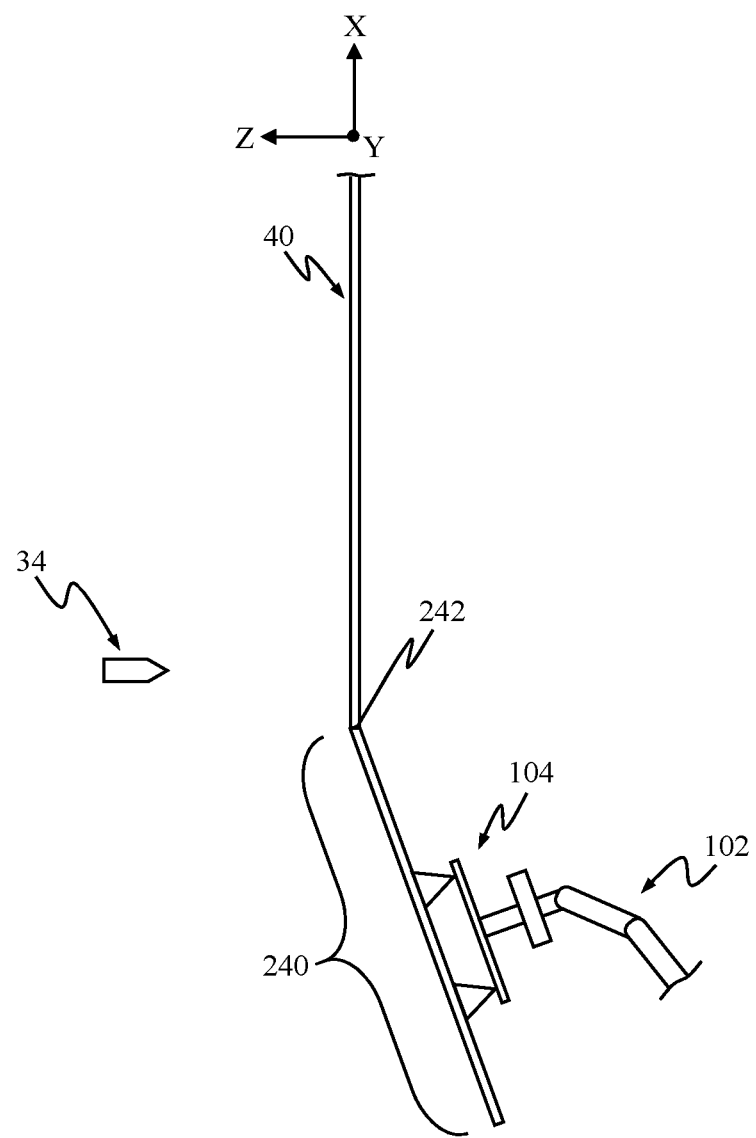
Figure 6F:
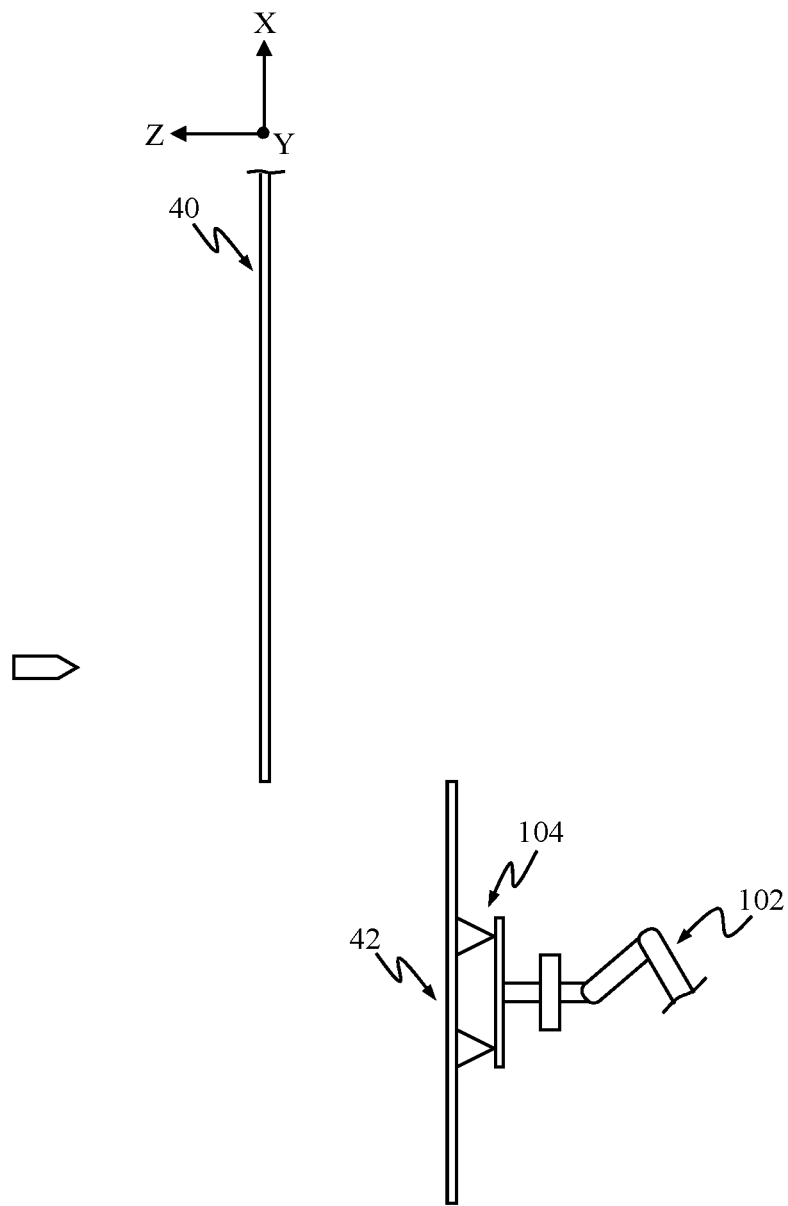

The robot position/speed control module 228 can include (or operate on) a predetermined or preprogrammed robot operational cycle (e.g., software) that designates predetermined locations, predetermined motions, and predetermined speeds of the end effector 104 at instances in time during a glass ribbon interface operation. By way of non-limiting example, one possible robot operational cycle is represented in FIGS. 6A-6F. At a cycle start time in FIG. 6A, the robot arm 102 can be in a home or start position, locating the end effector 104 away from the glass ribbon 40. The robot operational cycle then brings the end effector 104 into contact with a segment 240 (referenced generally) of the glass ribbon 40 as in FIG. 6B. It will be recalled that the glass ribbon 40 can be continuously moving in the direction 78. The robot operational cycle can account for this continuous movement when bringing the end effector 104 into contact with the glass ribbon 40, with the robot arm 102 moving or motioning the end effector 104 in both the X and Z directions from the arrangement of FIG. 6A to the arrangement of FIG. 6B. A scoring operation can than occur, as generally indicated in FIG. 6C, with the scoring apparatus 34 forming a score line 242 in the glass ribbon 40. The end effector 104 remains engaged with the segment 240 of the glass ribbon 40 during the scoring operation; because the glass ribbon 40 continues to move in the direction 78, the robot operational cycle can include the robot arm 102 moving the end effector 104 in the X direction at the expected or estimated rate of travel of the glass ribbon 40 during the scoring operation as revealed by a comparison of FIG. 6C (start of the scoring operation) with FIG. 6D (end of the scoring operation). As a point of reference, the glass ribbon 40 and the end effector 104 have traveled downwardly from the arrangement of FIG. 6C to the arrangement of FIG. 6D. The robot operational cycle can then include the robot arm 102 manipulating the end effector 104 to bend the engaged segment 240 relative to a remainder of the glass ribbon 40, with the engaged segment 240 effectively pivoting relative to a remainder of the glass ribbon 40 at the formed score line 242 as shown in FIG. 6E. This motion will eventually result in the engaged segment 240 breaking or separating away from the remainder of the glass ribbon 40 as shown in FIG. 6F (it being understood that once separated, the engaged segment 240 now constitutes a completed glass sheet). The robot operational cycle can include the robot arm 102 manipulating the end effector 104 to re-orientate the engaged glass sheet 42 in space and move the glass sheet 42 away from the glass ribbon 40. Movement of the glass sheet 42 away from the glass ribbon 40 is generally reflected in FIG. 6F; in some embodiments, the robot operational cycle will include moving the glass sheet 42 to a discrete area, and release the glass sheet 42 from the end effector 104 for additional processing. Regardless, once the glass sheet 42 has been released from the end effector 104, the robot operational cycle can include returning the robot arm 102 to the home or start position of FIG. 6A. The robot operational cycle is then repeated to produce additional glass sheets.

The preprogrammed robot operational cycle is conventionally premised upon an expected location in space of the glass ribbon 40, an expected thickness of the glass ribbon 40, an expected or estimated flow rate or travel speed of the glass ribbon 40, timing of the scoring operation, and a known location of the end effector 104. From these variables, the robot operational cycle program will automatically prompt the robot arm 102 to locate and move the end effector 104 to predetermined positions, in predetermined motions, and predetermined speeds at predetermined points in time (relative to the start time of the operational cycle) that will result in glass ribbon engagement, bending and glass sheet removal. Returning to FIG. 5, the robot position/speed control module 228 controls or dictates operation of the robot arm 102 (FIG. 3A) based upon the robot operational cycle program, but as modified or adjusted in view of the robot arm adjustment information (or a robot arm position adjustment command) generated by the force control algorithm 226. By way of one simplified example and with additional reference to FIG. 3A, the robot operational cycle program can provide that at the start (i.e., time(0)) of an interface handling cycle, the robot arm 102 is prompted to position the end effector 104 at a first location (X1, Y1, Z1). Based upon an expected location of the glass ribbon 40 (and perhaps other estimated or expected parameters such as an expected or estimated flow rate of the glass ribbon 40), the robot operational cycle program instructs that the robot arm 102 should be prompted to position the end effector 104 at a second location (X2, Y2, Z2) at time(1) to initially engage the glass ribbon 40, and then at a third location (X3, Y2, Z2) at time(2) as the end effector 104 remains engaged with the glass ribbon 40 and travels with the continuously moving glass ribbon 40. In the event the end effector 104 applies an elevated force onto the glass ribbon 40 in the Z direction at time(1), the force-related information generated by the sensor 110 at time(1) will be determined by the tracking error algorithm 222 to implicate that a linear force being exerted upon the glass ribbon 40 in the Z direction deviates from (e.g., exceeds) a target force. The force control algorithm 226 will then determine an extent to which the end effector 104 should be adjusted or moved in the Z direction such that the linear force being applied onto the glass ribbon 40 in the Z direction will more closely approximate the designated Z axis target force. This adjustment or correction information is delivered to the robot position/speed control module 228 that in turn adjusts or alters the robot operational cycle program and prompts the robot arm 102 to position the end effector 104 at location (X3, Y2, Z3) at time(2) (instead of location (X3, Y2, Z2) as otherwise called for by the robot operational cycle program). The resultant change in the robot end effector/glass ribbon interface dynamics is reflected in FIG. 5 at 230. As shown in FIG. 5, this feedback-based process control continues throughout the operational cycle, with the control system 106 constantly adjusting the position, motion, and/or speed instructions called for by the robot operational cycle program in view of force-related information provided by the sensor 110, attenuating excessive force/torque impacts on the glass ribbon 40 in real-time or near real-time. In some embodiments, the force-related information review and, where implicated, position, motion, and/or speed adjustment, is performed at a rate on the order of once every 10 milliseconds, although other analysis and adjustment rates are also acceptable.

In some embodiments, the force-related information generated by the sensor 110 may be utilized to enhance operation of other components of the glass manufacturing system 20 (FIG. 1). For example, during a scoring operation, the force-related information may indicate an excessive or increased force in the Z direction that in turn may implicate a motion imbalance across a thickness of the glass ribbon 40. Under these circumstances, operation of the scoring apparatus 34 can be automatically adjusted using system and control architectures akin to the descriptions above, for example adjusting a position of a nose body provided with the scoring apparatus 34 relative to the glass ribbon 40.

Embodiments and advantages of features of the present disclosure are further illustrated by the following non-limiting examples, but the particular materials and amounts thereof recited in these examples, as well as other conditions and details, should not be construed to unduly limit the scope of the present disclosure.

EXAMPLES

Figure 7:
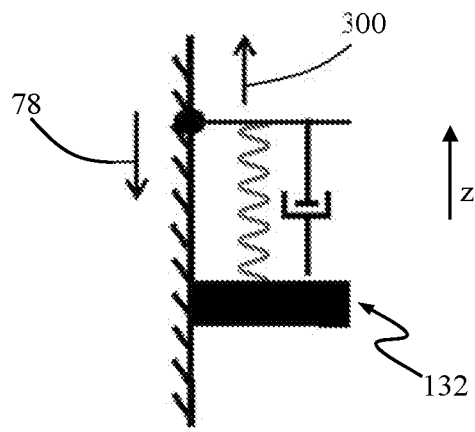
FIG. 7 is a schematic diagram of a mass-spring-damper system useful in devising a force control algorithm in accordance with principles of the present disclosure.

To evaluate an ability of the handling apparatuses and control systems of the present disclosure to improve the glass ribbon-robot interface during a handling operation, a representative model of the interface was developed. It was initially noted that in a conventional downdraw glass forming and handling system, the robot end effector carries several suction cups that contact the glass ribbon. The suction adds compliance into the dynamic behavior of the robot end effector contact. However, force sensor data representative of forces being applied onto the glass ribbon by the end effector enable modeling of this behavior into a mathematical form through targeted experiments. For example, and as shown in FIG. 7, contact between the robot through the end effector suction cups 132 and the glass ribbon 40 can be modeled as a mass-spring-damper system in the glass travel or draw direction 78. A contact force 300 can be designated as F(z, t), with a position offset of z(t). A mathematical model that can be used to describe this dynamic behavior is provided as Equation (1) below as a transfer function in the s domain (complex frequency domain):

$$\frac{Y(s)}{P(s)} = \frac{k\omega^2}{s^2 + 2\xi\omega s + \omega^2} \quad (1)$$

where
Y=the measured force/torque from the force sensors in one specific direction;
P=the robot position or angle;
k=the stiffness of the force contact;
ω=the natural frequency of the system behavior; and
ξ=the damping ratio of the system.

Figure 8:
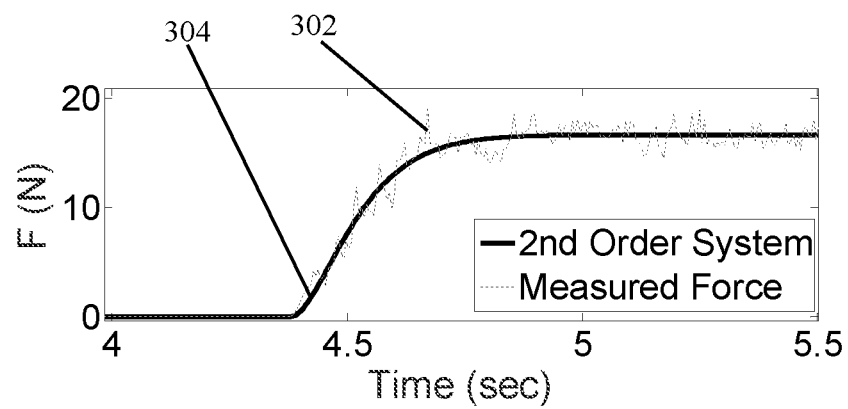
FIG. 8 is a plot of experimental data and a fitted model described in the Examples section.

Through experiments, an empirical model that has the structure of Equation (1) was obtained. As shown in FIG. 8 (showing experimental data (plot line 302) in a system identification experiment versus the fitted model based (plot line 304) on the experiment data via a least square fitting technique), the system dynamic model estimated based on the step response data was obtained through standard system identification techniques, and the model was found to have the form of Equation (2) below:

$$\frac{Y(s)}{P(s)} = \frac{4591}{s^2 + 28.67s + 203.6} \quad (2)$$

From Equation (2), the stiffness of the system was derived and used to evaluate the forces between the suction cups and the glass ribbon applied in the gravity direction as k=22.63 Newton/meter. Parameters of a force control algorithm or real-time feedback control scheme in accordance with principles of the present disclosure was then devised. This stiffness was further used to study the suction cup-related equipment and process performance.

Figure 9:
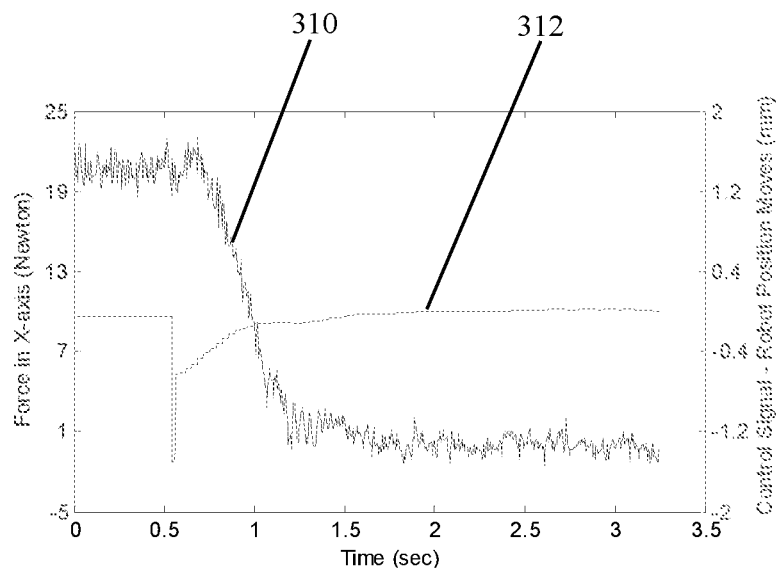
FIG. 9 is a graph of sensed force and robot position command signal over time as described in the Examples section.

For example, a simulated force control experiment was performed using the system architecture of FIG. 4, the control architecture of FIG. 5, and the force control algorithm devised from the empirical formula above. The experiments replicated a robot end effector interface with a downdraw produced glass ribbon traveling in the downdraw direction. An existing glass ribbon handling robot was modified by installing a force sensor (FS100 sensor from FANUC America Corp.) between the last joint of the robot arm and the suction cup-type end effector, capable of sensing force data in the downdraw (or X-axis) direction. Force-related information from the sensor was provided to a control system as described above, with the control architecture operating to send a control signal prompting the robot arm to adjust or change a position of the end effector (relative to the glass ribbon) by a determined distance when the sensed force exceeded a target force. With this experiment, an aluminum sheet was used to represent a glass ribbon. The glass ribbon handling robot was operated to initially locate the end effector at a pre-determined position relative to the stationary aluminum sheet, and then end effector was operated to engage the aluminum sheet. In this regard, the pre-determined initial position of the end effector was selected to ensure that an excessive force would be exerted onto the aluminum sheet; the control system then functioned to prompt a change in the location of the end effector responsive to this excessive force. The results of this experiment are shown in FIG. 9 in which the sensed force in the X-axis over time is plotted (trace 310), as is the robot position command or control signal (trace 312) and corresponding change in position prompted by the control signal. As shown, at time 0, a force in the X-axis on the order of 20 Newton (N) was initially introduced between the end effector and the aluminum sheet after suction to the end effector was turned on. The control system then functioned at approximately 500 milliseconds after time 0 to generate a control signal prompting the robot arm to move the end effector approximately 1.2 millimeters (mm) away from the aluminum sheet. As a result, the sensed applied force began decreasing nearly immediately. At approximately 1 second after time 0, the sensed force on the aluminum sheet was reduced to approximately 0. Thus, the control system successfully brought the applied force down to a zero set point beginning at 500 milliseconds from the time the excessive force was sensed.

Figure 10A:
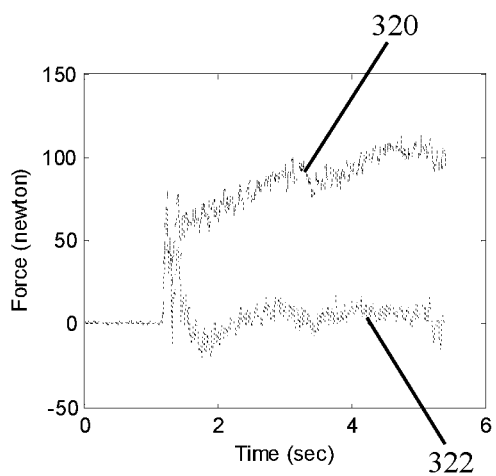
FIGS. 10A and 10B are graphs of the results of a line tracking experiment described in the Examples section.
Figure 10B:
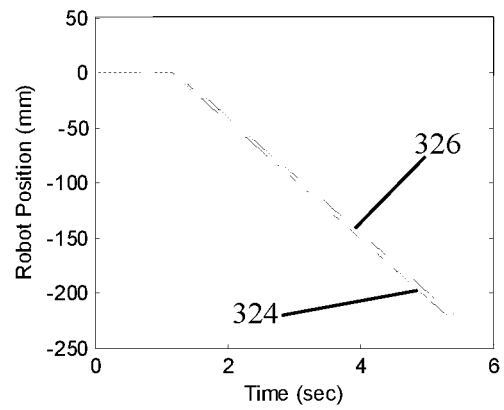

A simulated line tracking experiment was performed using the glass handling robot and control system architecture as described above to engage and move with a traveling aluminum sheet (simulating a glass ribbon traveling in a downdraw direction). With this experiment, the control system was programmed to perform a robot operational cycle program based upon an expected travel speed of the aluminum sheet, and during the experiment, the aluminum sheet was caused to travel at an actual speed that differed from the expected travel speed (i.e., a speed mismatch was purposefully caused to occur). During the experiment, the force sensed by the sensor was recorded, as was a positon of the end effector in the traveling direction. In a first test, the force control algorithm was not implemented by the control system; thus, during the first test, the end effector was manipulated by the robot arm in accordance with the robot operational cycle and based upon the expected travel speed. In a second test, the control system implemented the force control algorithm, operating to alter or adjust a position of the end effector in response to an excessive sensed force at the aluminum sheet. The results of the line tracking experiment are shown in FIGS. 10A and 10B. FIG. 10A plots the force sensed by the sensor over time, including trace 320 corresponding with the first test (line tracking with no force control) and trace 322 corresponding with the second test (line tracking with force control). FIG. 10B plots the position of the end effector over time, including trace 324 corresponding with the first test and trace 326 corresponding with the second test. As shown, when moving the end effector along with the aluminum sheet, the implemented robot force control reduced the force impact to nearly 0 by automatically adjusting or correcting the position of the end effector. The force control algorithm was seen to effectively serve as a speed compensator when a purposely introduced speed mismatch was present between the end effector and the sheet. The force controller added additional robot position movement during the glass tracking period or stage of the robot operation cycle program. The slope, which is the end effector position over time (i.e., robot speed), was adjusted automatically because of the force control.

Figure 11A:
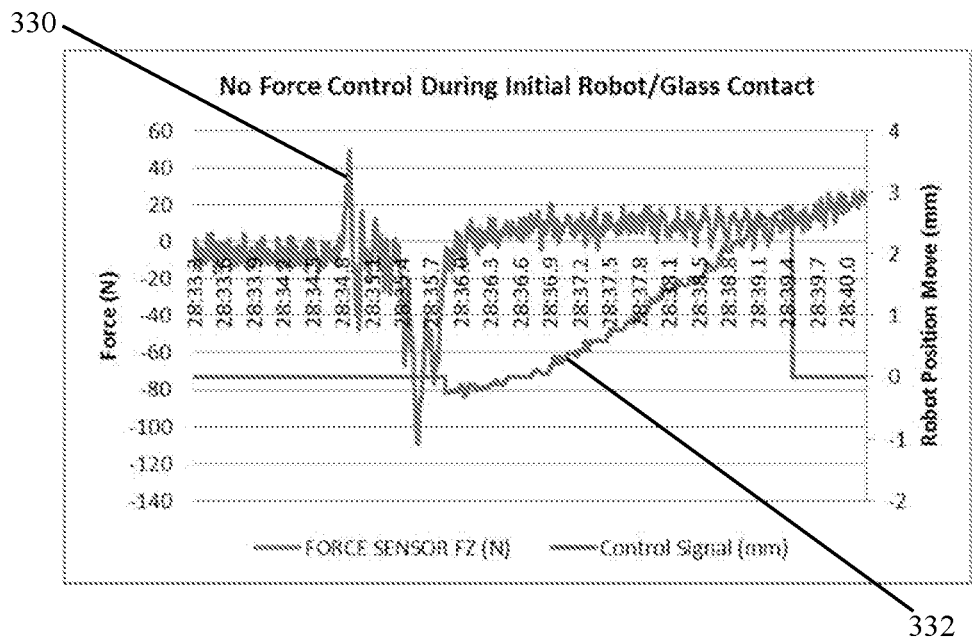
FIG. 11A is a graph of the results of a first force spike experiment described in the Examples section.
Figure 11B:
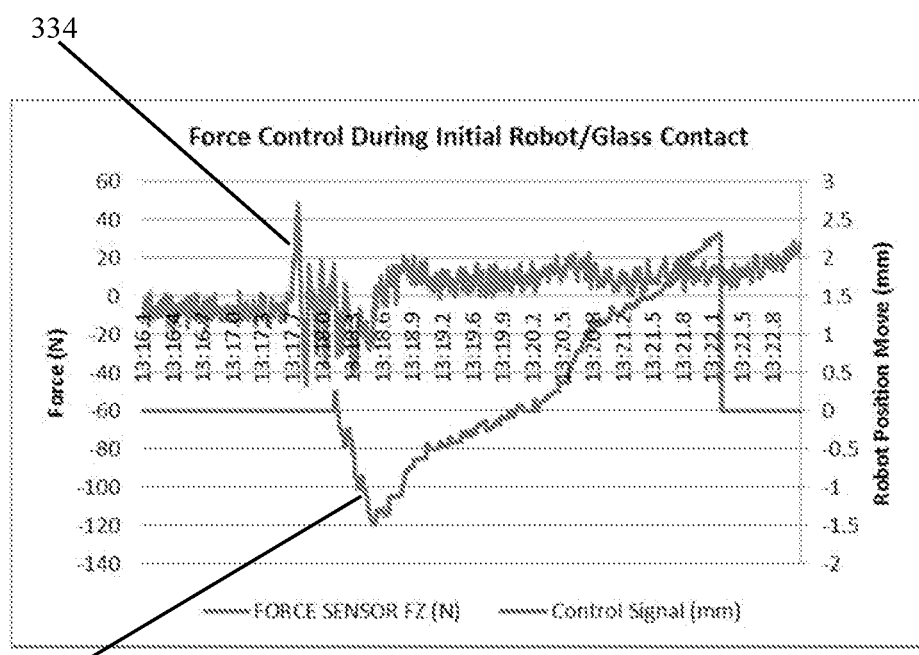
FIG. 11B is a graph of the results of second force spike experiment described in the Examples section.

A force spike control experiment was performed using the glass handling robot and control system architecture as described above to engage an actual glass ribbon traveling in a downdraw direction. With this experiment, the control system was programmed to perform a robot operational cycle program based upon an expected location (Z axis) and travel speed of the glass ribbon, and during the experiment, the glass ribbon was located along the Z axis at an actual location that differed from the expected location. A force spike in the Z direction occurred upon initial contact between the end effector and the glass ribbon due to an initial momentum generated when the robot-driven end effector moved into contact with the glass ribbon. During the experiment, the force sensed by the sensor was recorded, as was the robot position command or control signal and corresponding change in the Z axis position of the end effector as prompted by the control signal. In a first test, the force control algorithm was not implemented by the control system at the time of initial contact between the end effector and the glass ribbon; thus, during the first test, adjustments to a position of the end effector were effected by the control system only after the impact of the force of the initial contact had naturally subsided. The results of the first test are reported at FIG. 11A in which the sensed force over time is shown at trace 330, and the robot position command or control signal race and corresponding change in position prompted by the control signal is shown at trace 332. In a second test, the control system implemented the force control algorithm from the start time, including at the time of initial contact between the end effector and the glass ribbon. The results of the second test are reported at FIG. 11B in which the sensed force over time is shown at trace 334, and the robot position command or control signal race and corresponding change in position prompted by the control signal is shown at trace 336. A comparison of FIGS. 11A and 11B reveals that the control systems of the present disclosure can reduce a magnitude of the force spike occurring during initial robot end effector-glass ribbon contact, for example by more than 60%.

The systems, apparatuses and methods of the present disclosure provide a marked improvement over previous designs. As part of a glass sheet manufacturing system in which a glass ribbon is engaged by a robot arm-driven end effector, force-related information provided by one or more sensors can implicate one or more forces being experienced by the glass ribbon. For example, a multiple axis sensor installed to the robot arm can be employed. The force-related information, in turn, can be used to control one or more of a position, motion or speed of the robot arm to reduce the force impact on the glass ribbon in real-time or near real-time. In some embodiments, the control systems of the present disclosure can operate to improve the robot end effector-glass ribbon synchronization by reducing the induced force due to speed differences. In some embodiments, aspects of the present disclosure when utilized with a glass sheet manufacturing process in which glass sheets are individually separated from a continuously traveling (e.g., downdraw) glass ribbon, can improve stability of the glass ribbon formation process, avoid or reduce instances of glass breakage, widen the process window for handing thin glass ribbons and/or high glass ribbon flow rates, etc. In related embodiments, aspects of the present disclosure can provide precise control of the robot end effector force and/or torque during the glass sheet separation stage, thereby more effectively utilizing the amount of energy put into the glass ribbon to reduce instances of adhered glass defects.

Various modifications and variations can be made to the embodiments described herein without departing from the scope of the claimed subject matter. Thus it is intended that the specification cover the modifications and variations of the various embodiments described herein provided such modifications and variations come within the scope of the appended claims and their equivalents.

What is claimed is:

1. A method for forming a glass sheet comprising:
providing a robot including a robot arm, an end effector and a control system, wherein the robot arm carries the end effector, and further wherein movement of the robot arm is controlled by the control system;
flowing molten glass from a forming body in a downdraw process to form a continuously moving glass ribbon;
operating the robot arm to move the end effector through a robot operational cycle programmed to the control system, the robot operational cycle initiating at a start time, the robot operational cycle comprising:
engaging a segment of the glass ribbon with the end effector,
separating the engaged segment from a remainder of the glass ribbon to generate a glass sheet,
moving the glass sheet away from the glass ribbon,
wherein the robot operational cycle comprises predetermined positions of the end effector at predetermined points in time following the start time; and
during the step of operating:
sensing at least one parameter indicative of at least one force exerted on the glass ribbon by the end effector,
altering a position of the end effector to differ from the predetermined position at the corresponding point in time after the start time when the sensed parameter deviates from a target value via programing of the control system.

2. The method of claim 1, further comprising:
forming a score line in the continuously moving glass ribbon;
wherein the step of separating the engaged segment comprises separating the engaged segment at the score line.

3. The method of claim 1, further comprising repeating the step of operating to form a subsequent glass sheet.

4. The method of claim 1, wherein the step of sensing at least one parameter comprises operating a force sensor carried by the robot.

5. The method of claim 4, wherein the force sensor comprises a multiple-axis force sensor.

6. The method of claim 4, wherein the robot arm includes a plurality of arm segments and a wrist segment, wherein the wrist segment carries the end effector and is connected to a leading arm segment of the plurality of arm segments by a joint, and further wherein the force sensor is positioned along the wrist segment at a location spaced away from the joint such that the force sensor is between the joint and the end effector.

7. The method of claim 1, wherein the step of sensing comprises sensing at least one of a linear force and a torque applied to the glass ribbon by the end effector, and further wherein the step of altering comprises determining a position adjustment based upon the at least one of a sensed linear force and a sensed torque.

8. The method of claim 7, wherein the step of sensing further comprises sensing a linear force and sensing a torque applied to the glass ribbon by the end effector along at least two axes.

9. The method of claim 1, wherein the step of altering comprises determining a correction value based upon the sensed parameter and by which at least one of the predetermined positions is changed.

10. The method of claim 1, repeating the steps of sensing and altering during at least the steps of engaging and separating.

11. The method of claim 10, wherein the steps of sensing and altering are performed at least once per 0.1 second during the steps of engaging and separating.

12. The method of claim 1, wherein the robot operational cycle comprises moving the end effector at a predetermined velocity at predetermined points in time after the start time, the method further comprising altering a velocity of the end effector to differ from the predetermined velocity at the corresponding point in time after the start time when the sensed parameter exceeds a target value.

13. The method of claim 1, wherein the step of engaging comprises:
directing the end effector from a home position to a predetermined position corresponding with an expected location of the glass ribbon;
operating the end effector to engage the glass ribbon; and
moving the end effector at a velocity and in a direction corresponding with an expected velocity and expected direction of the glass ribbon.

14. The method of claim 1, wherein the glass ribbon defines opposing, first and second major surfaces, and further wherein the steps of sensing and altering include:
sensing a linear force exerted on the glass ribbon by the end effector in a direction perpendicular to a plane of the second major surface; and
altering a position of the end effector to differ from the predetermined position at the corresponding point in time after the start time when the sensed linear force deviates from a designated target force.

15. A system for producing a glass sheet comprising:
a forming body for forming a glass ribbon from a molten glass; and
a handling apparatus for interfacing with the glass ribbon, the handling apparatus comprising:
a robot arm,
an end effector carried by the robot arm, the end effector configured to selectively engage a segment of the glass ribbon,
a sensor carried by the robot arm and configured to sense at least one parameter indicative of a force exerted on the glass ribbon by the end effector,
a control system configured to control movements of the robot arm,
wherein the control system is programmed to perform a robot operation cycle initiating at a start time, the robot operational cycle comprising,
engaging a segment of the glass ribbon with the end effector by manipulation of the robot arm,
separating the engaged segment from a remainder of the glass ribbon to generate a glass sheet,
moving the glass sheet away from the glass ribbon by manipulation of the robot arm,
wherein the robot operational cycle comprises a predetermined position of the end effector at predetermined points in time following the start time,
and further wherein the control system is programmed to prompt the robot to alter a position of the end effector to differ from the predetermined position at the corresponding point in time after the start time in response to a determination that the at least one sensed parameter deviates from a target value.

16. The system of claim 15, wherein the sensor is configured to sense at least one of a liner force and a torque.

17. The system of claim 15, wherein the sensor comprises a multiple-axis force sensor.

18. The system of claim 15, wherein the sensor is positioned between a joint of the robot arm and the end effector.

19. The system of claim 15, wherein the end effector comprises at least one suction cup.

* * * * *